US008127336B2

(12) United States Patent
Bienek et al.

(10) Patent No.: US 8,127,336 B2
(45) Date of Patent: Feb. 28, 2012

(54) SYSTEMS AND METHODS FOR POLICY-BASED SERVICE MANAGEMENT

(75) Inventors: Michal Bienek, Kanata (CA); Dmitry Toptygin, Kanata (CA); Pascal Henry, Enghien-les-Bains (FR); Yong Li, Kanata (CA)

(73) Assignee: Bridgewater Systems Corp., Ottawa (CA)

( * ) Notice: Subject to any disclaimer, the term of this patent is extended or adjusted under 35 U.S.C. 154(b) by 938 days.

(21) Appl. No.: 11/712,570

(22) Filed: Mar. 1, 2007

(65) Prior Publication Data

US 2008/0216148 A1    Sep. 4, 2008

(51) Int. Cl.
*H04L 29/00* (2006.01)
(52) U.S. Cl. .......................................................... 726/1
(58) Field of Classification Search ........................ 726/1
See application file for complete search history.

(56) References Cited

U.S. PATENT DOCUMENTS

| | | | |
|---|---|---|---|
| 6,578,076 B1 | 6/2003 | Putzolu | |
| 6,880,005 B1 * | 4/2005 | Bell et al. ....................... | 709/225 |
| 6,941,465 B1 | 9/2005 | Palekar et al. | |
| 6,993,514 B2 | 1/2006 | Majoor | |
| 7,080,142 B2 | 7/2006 | Galloway et al. | |
| 2004/0039942 A1 | 2/2004 | Cooper et al. | |
| 2005/0047412 A1 * | 3/2005 | Hares ............................. | 370/392 |
| 2005/0192916 A1 | 9/2005 | Serrano-Morales et al. | |
| 2005/0246302 A1 | 11/2005 | Lorenz et al. | |
| 2006/0005227 A1 | 1/2006 | Samuelsson et al. | |
| 2006/0005228 A1 | 1/2006 | Matsuda | |
| 2006/0085838 A1 | 4/2006 | Samuelsson et al. | |
| 2006/0106745 A1 | 5/2006 | Armstrong et al. | |
| 2006/0143685 A1 | 6/2006 | Vasishth et al. | |
| 2007/0204326 A1 * | 8/2007 | Bocking et al. .................... | 726/1 |
| 2008/0034401 A1 * | 2/2008 | Wang .................................. | 726/1 |

FOREIGN PATENT DOCUMENTS

| | | |
|---|---|---|
| EP | 1 311 083 A2 | 5/2003 |
| WO | WO 2004/002062 A1 | 12/2003 |

OTHER PUBLICATIONS

International Search Report and Written Opinion, dated Feb. 10, 2009, for PCT Patent Application No. PCT/IB2007/004604, 12 pages.

(Continued)

*Primary Examiner* — Vivek Srivastava
*Assistant Examiner* — Anthony Brown
(74) *Attorney, Agent, or Firm* — Zilka-Kotab, PC (57) ABSTRACT

Systems and method for policy-based service management are provided. An exemplary system includes a rule definition interface module configured to receive a plurality of rule definitions and a separate policy management interface module configured to allow a user to define a rule instance from an existing rule definition instance and to define a policy instance based on the defined rule instance. A policy may be simply expressed via the policy management interface as "perform the following set of action if all of the following rule instances are true unless any of the following rule instances are true." Additionally, policies may be associated with a context at a specific a level in a context hierarchy having multiple levels. The policy may therefore inherit rules from contexts at a higher level in the hierarchy.

30 Claims, 8 Drawing Sheets

OTHER PUBLICATIONS

Borders, Kevin et al., "CPOL: High Performance Policy Evaluation," CCS '05, Nov. 7-10, 2005, Alexandria, VA, pp. 147-157.

Ceri, Stefano et al., "Automatic Generation of Production Rules for Integrity Maintenance," ACM Transactions on Database Systems, vol. 19, No. 3, Sep. 1994, pp. 367-422.

Weitzner, Daniel J. et al., "Creating a Policy-Aware Web: Discretionary, Rule-Based for the World Wide Web," http://www.w3.org/2004/09/Policy-Aware-Web-acl.pdf, 24 pages.

Zurko, Mary Ellen and Simon, Richard T., "User-Centered Security," 1996 ACM New Security Paradigm Workshop, Lake Arrowhead, CA, pp. 27-33.

* cited by examiner

Content Stream Information

Allow access if ALL of the following are true
- Min age — 645
- List of countries
- Day of week
- Add another rule

Deny access if ANY of the following are true
- Date range — 645
- Add another rule — 630

Age range
Current date
Date range
Day of week
List of countries
Max age
Min age
Month of year
Network type
Subscriber account funds
Subscriber on the network
Subscriber roaming
Time of day range

635

Content Providers
Service Packages
Subscribers
- Gold:BronzeSP
- Instant News
  - Young:SilverSP
  - Middl-Gold:SP Canada
  - Middl-Gold:SP-US 610
620
640

Test access to this Content Stream ▸ trash

© 2006 Bridgewater Systems Corporation

Content Stream Information

Allow access if ALL of the following are true

☐ Min age
☐ List of countries
☐ Day of week
Add another rule

Deny access if ANY of the following are true

☐ Date range
☐ Month of year

Current month is in the list
☑ January
☐ February
☐ March
☐ April
☐ May
☐ June
☐ July
☐ August
☐ September
☐ October
☐ November
☐ December
save

⎫
⎬ 740
⎭

Add another rule

Test access to this Content Stream

Content Providers
Service Packages
 Old BronzeSP
 Instant News
Subscribers
 Young SilverSP
 Mddl GoldSP Canada
 Mddl GoldSP US

FIG. 8

SYSTEMS AND METHODS FOR POLICY-BASED SERVICE MANAGEMENT

FIELD OF THE INVENTION

This application relates generally to network-based service management.

BACKGROUND OF THE INVENTION

Subscribers use networks to access applications and resources such as voice, video, gaming, and conferencing from their communication devices such as phones, personal digital assistants (PDAs), laptop, and desktop computers. Providers of these applications and resources utilize policies to determine whether a subscriber is authorized to access the requested service or application.

Because of the complexity of creating policies in current rule-based approaches, many of these current rule-based systems limit a service provider to a simple yes or no answer when access to a specific application or resource is attempted. The ability to specify additional actions or parameters associated with an access attempt is limited or non-existent in these systems.

Furthermore, rule definition is tied directly to policy creation. For example, in these systems, a rule engine is used to define and enact subscriber policies. Typical rule engines have a rule definition interface that allows rules to be defined as predicate statements such as "If condition then action" or as decision trees that use a flow-chart format. However, to define a policy based on conditions, a rule engine-based interface requires that each step be defined in a step-by-step fashion. As conditions and path variations increase, the complexity and difficulty of entering policies increases. In addition, when rules change in a rule-engine, applications interacting with the rule engine may need code changes or end-user interaction (e.g., in the form of application restarts), in order to update the applications. Furthermore, current rule engines do not allow for the extension of existing rule definitions to new rule instances. Instead, new rule flows must be created for each rule instance.

What is therefore needed are systems and methods which separate rule definition from policy definition.

What is further needed is a simple, extensible method for expressing policies, particularly at a subscriber-level basis.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Separation of Rule Definition from Policy Creation

The policy-based approaches to service management described herein allow providers to offer personalized and tiered services to subscribers. Policies define network and application behaviors which may be based on the individual characteristics and/or entitlements of a subscriber. A policy may be associated with a context such as subscriber, a provider, or an individual resource. For example, policies may define access to applications based on criteria such as subscription levels, age, location; may define the quality of service such as bandwidth, jitter, and delay based on subscription and application requirements; may specify charges based on network access, quality of service, application access, special offers; and/or may specify security based on criteria such as authentication strength and risk assessment.

1.1 Architecture

Figure 1:
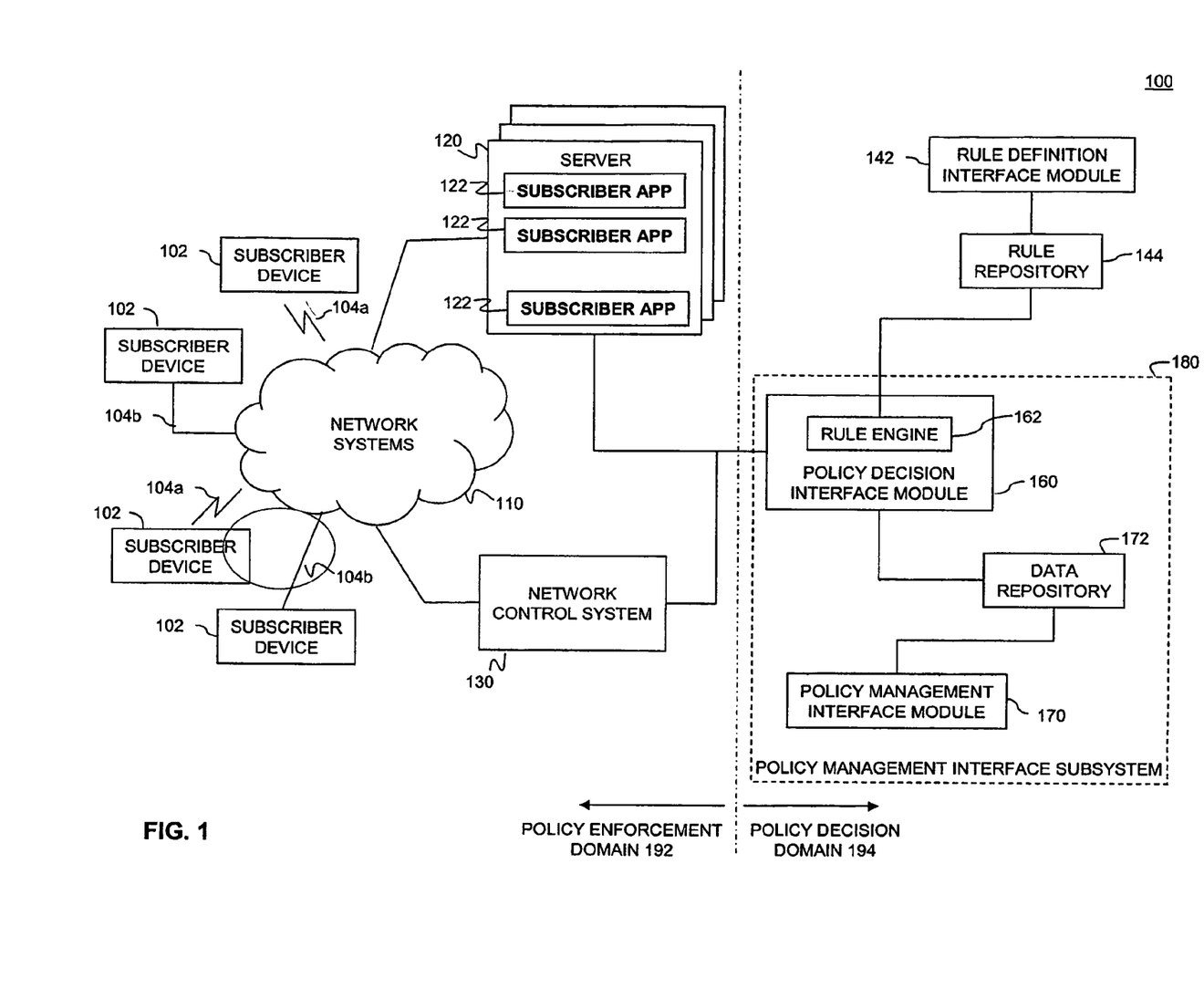
FIG. 1 is a block diagram of a logical view of an exemplary operating environment for policy-based service management, according to embodiments of the present invention.

FIG. 1 is a block diagram of a logical view of an exemplary operating environment 100 for policy-based service management, according to embodiments of the present invention. Operating environment 100 can be considered as having two logical domains—a policy enforcement domain 192 and a policy decision domain 194. At a high level, policy enforcement domain 192 is configured to enforce policies when an attempt to access a resource is initiated by the subscriber or subscriber device 102. Policy decision domain 194 is configured to allow the creation of policies and to make the determination of whether an action should be performed for a subscriber based on the defined policies.

A policy defines, for example, whether a subscriber can access a specific network, application, service, or other resource, the level of access to be provided to a subscriber, the quality of service to be provided, and/or other network or service parameters or behaviors. For ease of description, content (e.g., video, audio, or multi-media), services, applications, or other network hardware and/or software resources are referred to herein as a "resource." A policy includes a set of actions (e.g., allow access, provide high QOS, etc.) and a set of rule instances for determining whether the set of actions should be performed. A rule instance contains one or more conditions. For example, a rule definition may be "allow access on a weekday." The condition is therefore that the day must be a weekday.

In conventional rule-based service management systems, policies are hard-coded into program logic prior to deployment of the logic in the network. Policy decision domain 194 of FIG. 1, in contrast, allows for the creation and modification of policies after deployment.

Policy decision domain 194 includes a rule definition interface module 142, a rule repository 144, and a policy management interface subsystem 180. Rule definition interface module 142 interfaces with rule engine 162 and is configured to allow a user such as a system administrator to create rule definitions. A rule definition is a template for a rule. The rule definition includes one or more conditions. A condition may include an element, a comparator, and a variable. A rule variable is a placeholder for a value which is entered by a user when defining a policy instance. For example, in the rule condition: subscriber age is greater than AGE, the condition element is "subscriber age", the comparator is "greater than" and the variable is "AGE."

Rule repository 144 stores the rule definitions. Rule repository 144 may be any type of data storage including, but not limited to, a database.

The policy management interface subsystem 180 is separate from the rule definition interface module 142. Policy management interface subsystem 180 includes policy decision interface module 160, data repository 172, and policy management interface module 170.

Policy management interface module 170 is configured to allow a user to create instances of rules and to define policies by applying one or more rule instances. In an embodiment, policy management interface module 170 includes a graphical user interface (GUI). In addition or alternatively, policy management interface module 170 includes an application programming interface (API). For example, an instance of a rule includes a set of values to be applied to a variable in a rule condition for a specific policy. For example, an instance of the rule defined as "allow access on a weekday" is "allow access on Tuesday." In an embodiment, policy management interface module 170 uses a generic simple policy expression method to define policies. The generic simple policy expression method is described in further detail in section 2 below.

In current rule-based systems, rule instances are created and values are specified at the same time the rule is defined. In contrast, in the system of FIG. 1, policy creation is separated from rule definition allowing a user to create new policies from existing rule definitions without the need to access rule engine 162 directly.

Data repository 172 is configured to store the defined policies and data upon which the defined rules operate. Data repository 172 may be any type of data storage including, but not limited to, a database.

Policy decision interface module 160 includes rule engine 162. Rule engine 162 is configured to enact subscriber policies based on configurable logic statements and other data. Policy decision interface module 160 receives a request for a service management decision and interacts with rule repository 144, data repository 172, and optionally network control system 130 to obtain information necessary to make the requested decision.

As would be appreciated by persons of skill in the art, the components of policy decision domain 194 do not have to be implemented in separate devices. A portion or all of the components may be implemented in the same device.

Policy enforcement domain 192 may include one or more subscriber devices 102, network systems 110, one or more servers 120, and one or more network control systems 130. Subscriber devices 102 access the network or network resources via network systems 110. Network systems 110 may be any type of communication network including a wireless network, a public data network such as the Internet, a private data network, and/or the public switched telephone network. The interface between subscriber devices may be a wireless interface 104*a* or a wired interface 104*b*.

Server 120 may include one or more resources (e.g., subscriber applications 122). Server 120 is also configured to mediate access by a subscriber or subscriber device to the network and/or one or more resources. Server 120 communicates with policy decision interface module 160 to request a service management decision when a subscriber attempts access to the network or a network resource.

Network control system 130 is configured to store information associated with subscribers. In an embodiment, network control system 130 includes a session storage facility.

1.2 Method for Defining Policy Instances at Run-Time

Figure 2:
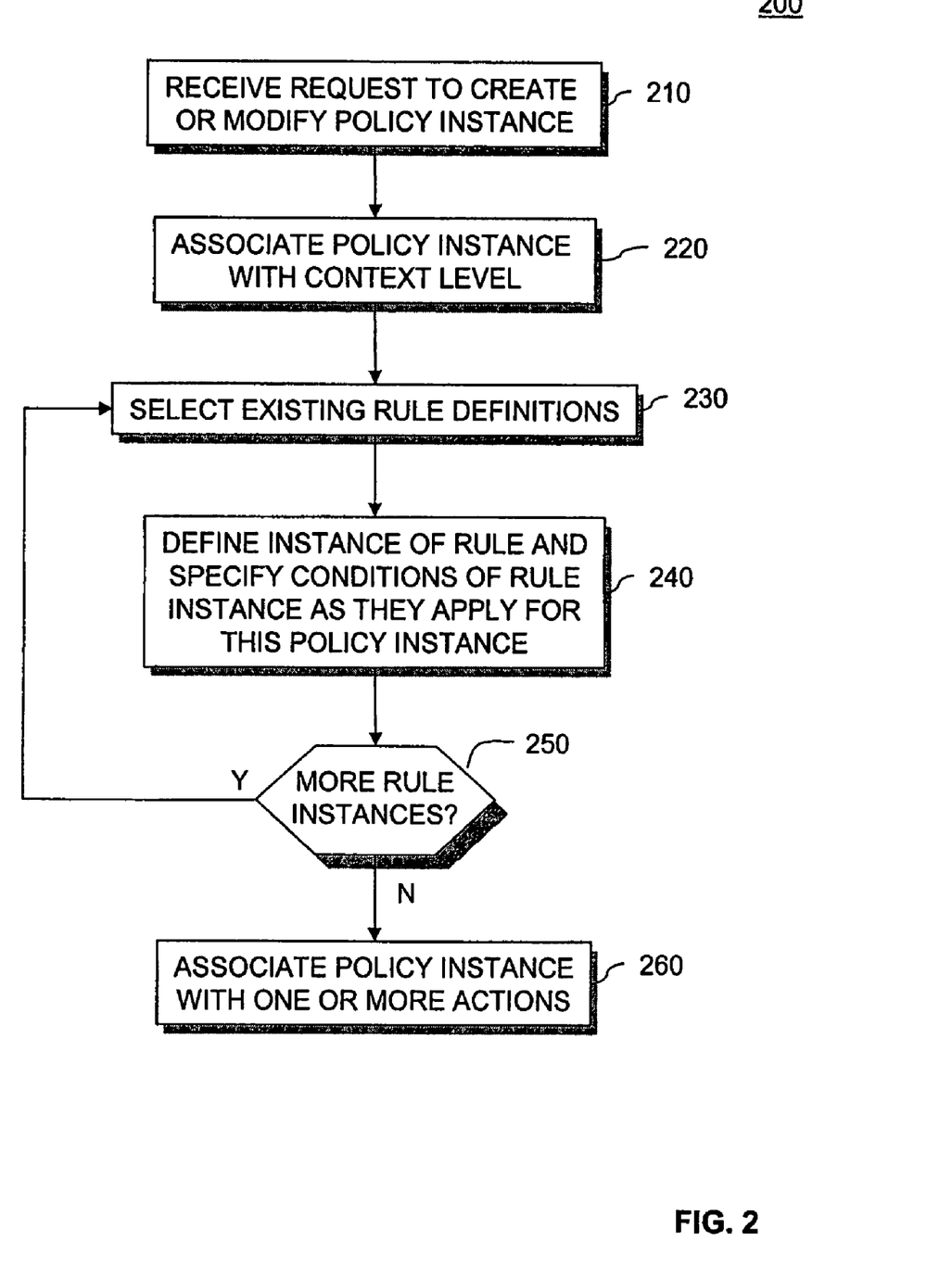
FIG. 2 is a flowchart of an exemplary method for defining at run-time policy instances using existing rule definitions, according to embodiments of the present invention.

FIG. 2 is a flowchart 200 of an exemplary method for defining policy instances using existing rule definitions, according to embodiments of the present invention. FIG. 2 is described with reference to the exemplary operating environment of FIG. 1. However, flowchart 200 is not limited to that embodiment. Note that some of the steps in FIG. 200 do not have to occur in the order shown.

Prior to step 210, one or more rule definitions are created in rule engine 162 using rule definition interface module 142. In an embodiment, the rule definitions are templates in which variables may be used to indicate that a value substitution will be required by the policy decision interface module 160 and a value specification will be required from policy management interface module 170. These rule definitions are stored in rule repository 144 and made available to policy management interface module 170.

In addition, prior to step 210, policy management interface module 170 presents the user with a graphical user interface including a mechanism for creating a new policy instance.

In step 210, policy management interface module 170 receives a request to create a policy instance or modify an existing policy instance. In response to the request, the policy management interface module 170 presents the user with a graphical user interface including a set of existing rule definitions and optionally a set of predefined actions.

In step 220, the user of the policy management interface subsystem 180 associates the policy instance with a context. Examples of contexts include, but are not limited to, content stream (service/application provided by the network), service package (grouping of services/applications) or subscriber. For example, a policy instance may be created for a subscriber when the subscriber registers for a service or application. Note that step 210 may occur at any point during flowchart 200.

In step 230, a selection of an existing rule definition from the set of rule definitions is received. In response to the selection, the policy management interface module 170 displays the rule definition in the graphical user interface. If the rule definition includes a variable, a set of possible values for the variable is also displayed in the graphical user interface. In an embodiment, the set of possible values is predefined by a user.

In step 240, an instance of the rule and condition values associated with the rule instance are received. The condition values are selected from a set of values for the variables. As described above, the set of values may be predefined by a user. For example, the user of the policy management interface subsystem 180 may create an instance of the subscriber age rule (e.g., subscriber must be older than "VARIABLE") and associate a value of 21 with the rule variable.

In step 250, a determination is made whether any additional rule instances are to be created. For example, the user may activate a link, button, or similar mechanism to indicate to policy management interface module 170 that an additional rule instance is to be associated with the policy instance. If an additional rule instance is to be created, operation returns to step 220. If no additional rule instances are to be created, operation proceeds to step 260.

In step 260, one or more actions are received and associated with the policy instance. This step is optional. An action may include any action that an entity requesting a policy-based service management decision can take. Exemplary actions include provide access, provide a certain QOS, or route the subscriber to a specific web page or application. Note that step 260 may occur at any point during flowchart 200.

1.3 Method for Enforcing Policies

Figure 3:
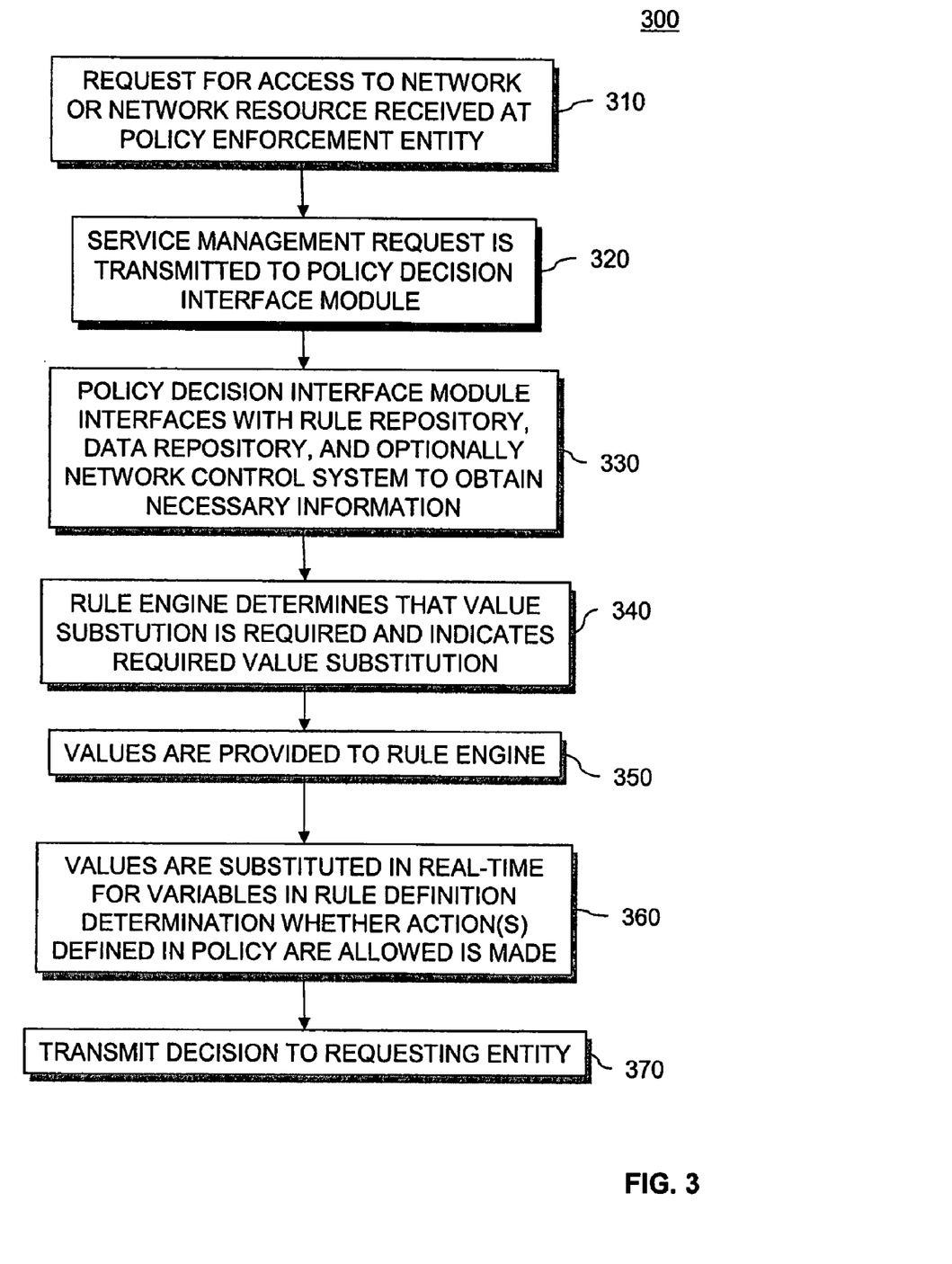
FIG. 3 is a flowchart of an exemplary method for enforcing policies, according to embodiments of the present invention.

FIG. 3 is a flowchart 300 of an exemplary method for enforcing policies, according to embodiments of the present invention. FIG. 3 is described with reference to the exemplary operating environment of FIG. 1. However, flowchart 300 is not limited to that embodiment. Note that some of the steps in FIG. 300 do not have to occur in the order shown.

In step 310, a request for access to the network or a network resource is received from a subscriber device 102 at a policy enforcement entity (e.g., server 120). Additionally or alternatively, a subscriber may request access to a specific resource. For example, a user may turn-on a mobile or data device or attempt access to a network. As a function of activating the device or requesting access to the network, a listing of the applications or services available (e.g., streaming content) for the subscriber may be requested.

In step 320, a network entity (e.g., server 120) transmits a service management request to the policy decision interface module 160. In an embodiment, the service management request identifies the subscriber and/or subscriber device 102 and the network or resource for which access is requested. The request may also include additional information about the subscriber, the subscriber device, and/or the resource requested.

In step 330, the policy decision interface module 160 interfaces with the rule repository 144, the data repository 172, and optionally the network control system 130 to obtain information necessary to make the requested service management decision. In an embodiment, policy decision interface module 160 may access the rule repository 144 to obtain one or more rule definitions associated with a request. Alternatively, a set of rule definitions may be received beforehand (e.g., at the start of the day or at periodic intervals) and cached at the policy decision interface module 160. In an additional alternative, the policy decision interface module 160 may obtain a first group of rule definitions from the rule repository 144 when a request is received (e.g., if rule is based on subscriber age) and may download and cache a second group of rule definitions in advance (e.g., if rule is based on day of week).

In step 340, rule engine 162 determines that a value substitution is required for one or more variables in a rule definition and indicates the required value substitution(s) to the policy decision interface module 160.

In step 350, the policy decision interface module 160 provides the values to rule engine 162. In an embodiment, the policy decision interface module 160 accesses data repository 172 to obtain the values to be applied to the variable in the rule instance. For example, the values may be specified in the rule instances found in the policy instance being evaluated.

In step 360, the values are substituted in real-time for the variables in the rule definition and a determination is made whether the action(s) defined in the policy are allowed.

In step 370, the decision is transmitted to the requesting entity. The decision may direct the entity to perform a set of actions specified in the policy such as whether requested access is authorized, the level of service to provide to the subscriber or other service parameters, and/or additional actions to take prior to providing access to the resource (e.g., routing subscriber to another web page for entry of additional information). Alternatively, the decision may direct the entity to deny access to the subscriber.

2. Generic Simple Policy Expression Method

The generic simple policy expression method provides a mechanism for defining policy instances, which is simpler to understand and configure than policy and rule expressions defined via a typical rule definition interface. As discussed above, a rule-engine-based interface requires that each step be defined in a step-by-step fashion. This definition technique becomes complex and convoluted for a user when many conditions and many path variations exist.

The following is an example of a policy instance defined using a typical rule-engine-based definition technique. The policy instance example includes a hierarchical dependence of rules and actions:

```
IF subscriber age is greater than 18 THEN
    IF subscriber has subscribed to gold package THEN
        IF day of week is NOT a weekend day [Saturday, Sunday] THEN
            IF today is NOT a civic holiday [holiday list] THEN
                ACTION 1 - provide access to video application
                ACTION 2 - provide maximum network quality of service
```

Figure 4:
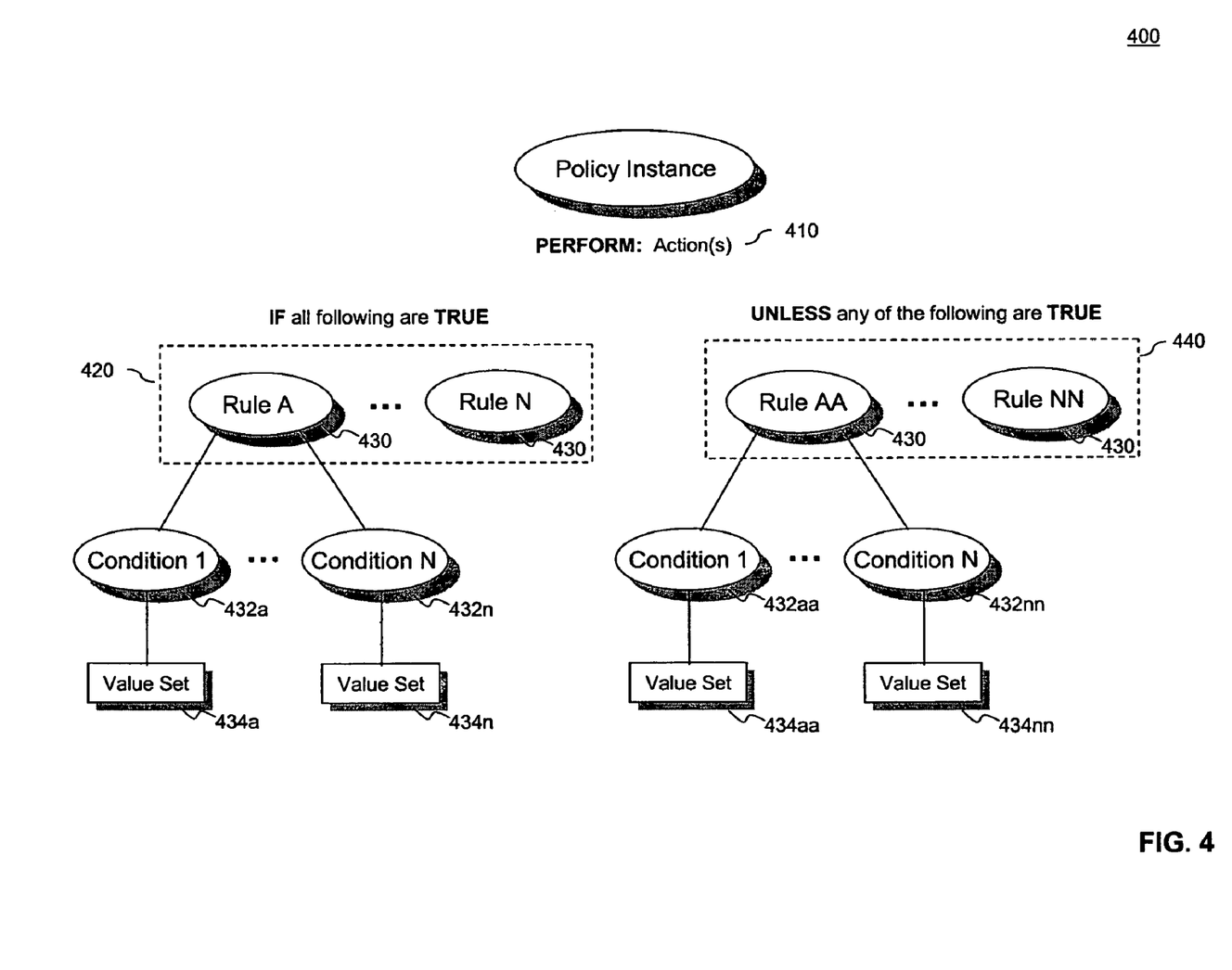
FIG. 4 depicts a policy instance defined using a generic simple policy expression method, according to embodiments of the present invention.

In contrast, in the generic simple policy expression method, a policy instance includes a set of actions, a set of inclusion rules and a set of exclusion rules. At a high level, a policy instance is defined using the generic simple policy expression method as follows:

PERFORM a set of actions
IF all of the rule instances in inclusion rule set are TRUE
UNLESS any of the rule instances in the exclusion rule set are TRUE FIG. 4 depicts a policy instance 400 defined using a generic simple policy expression method, according to embodiments of the present invention. Policy instance 400 includes a set of actions 410, a set of inclusion rules 420, and a set of exclusion rules 440. The set of inclusion rules 420 includes any number of rule instances 430. The set of exclusion rules 440 includes any number of rule instances 430. Either the set of inclusion rules or the set of exclusion rules may be empty but not both. That is, there must be at least one rule instance associated with a policy instance. Each rule instance includes at least one condition 432 and optionally a set of values 434 specified for the condition 432.

The following is an example of the policy instance for a rule-based-engine defined using the generic simple policy expression method.
PERFORM ACTIONS
(1) allow video application access AND
(2) allow maximum network QOS
IF ALL OF THE FOLLOWING APPLY:
subscriber age is greater than 18
subscriber package is gold package
subscriber location is Europe
UNLESS ANY OF THE FOLLOWING APPLY:
today is Saturday or Sunday
today is a civic holiday [from list of holidays]

As can be seen from the above example, an administrator can simply add a new rule instance to the set of inclusion rules or the set of exclusion rules.

Figure 5A:
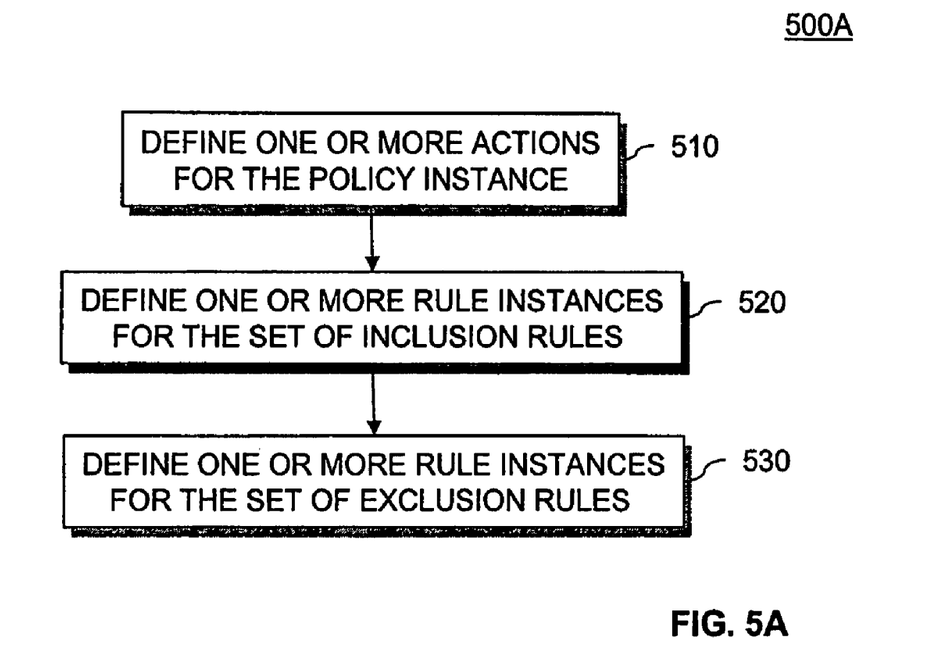
FIG. 5A is a flowchart of an exemplary method for defining policy instances using a generic simple policy expression method, according to embodiments of the present invention.

FIG. 5A is a flowchart 500A of an exemplary method for defining policy instances using a generic simple policy expression method, according to embodiments of the present invention. FIG. 5A is described with reference to the exemplary operating environment of FIG. 1. However, flowchart 500A is not limited to that embodiment. Note that some of the steps in FIG. 5A do not have to occur in the order shown.

Prior to step 510, the policy management interface module 170 presents the user with a graphical user interface having a section for defining a set of inclusion rules and a section for defining a set of exclusion rules. The graphical user interface may also include a section for defining a set of actions.

In step 510, one or more actions are defined for the policy instance. Actions may include but are not limited to specifying whether access to a resource is allowed, specifying the level of access allowed, and/or specifying other parameters associated with the application or resource. Example actions include "allow access to requested content," "re-direct user to a log-in page," or "present billing page and request additional credit."

In step 520, one or more rule instances are defined for the set of inclusion rules. An exemplary method for defining rule instances is described below in reference to FIG. 5B.

In step 530, one or more rule instances are defined for the set of exclusion rules. An exemplary method for defining rule instances is described below in reference to FIG. 5B.

Figure 6:
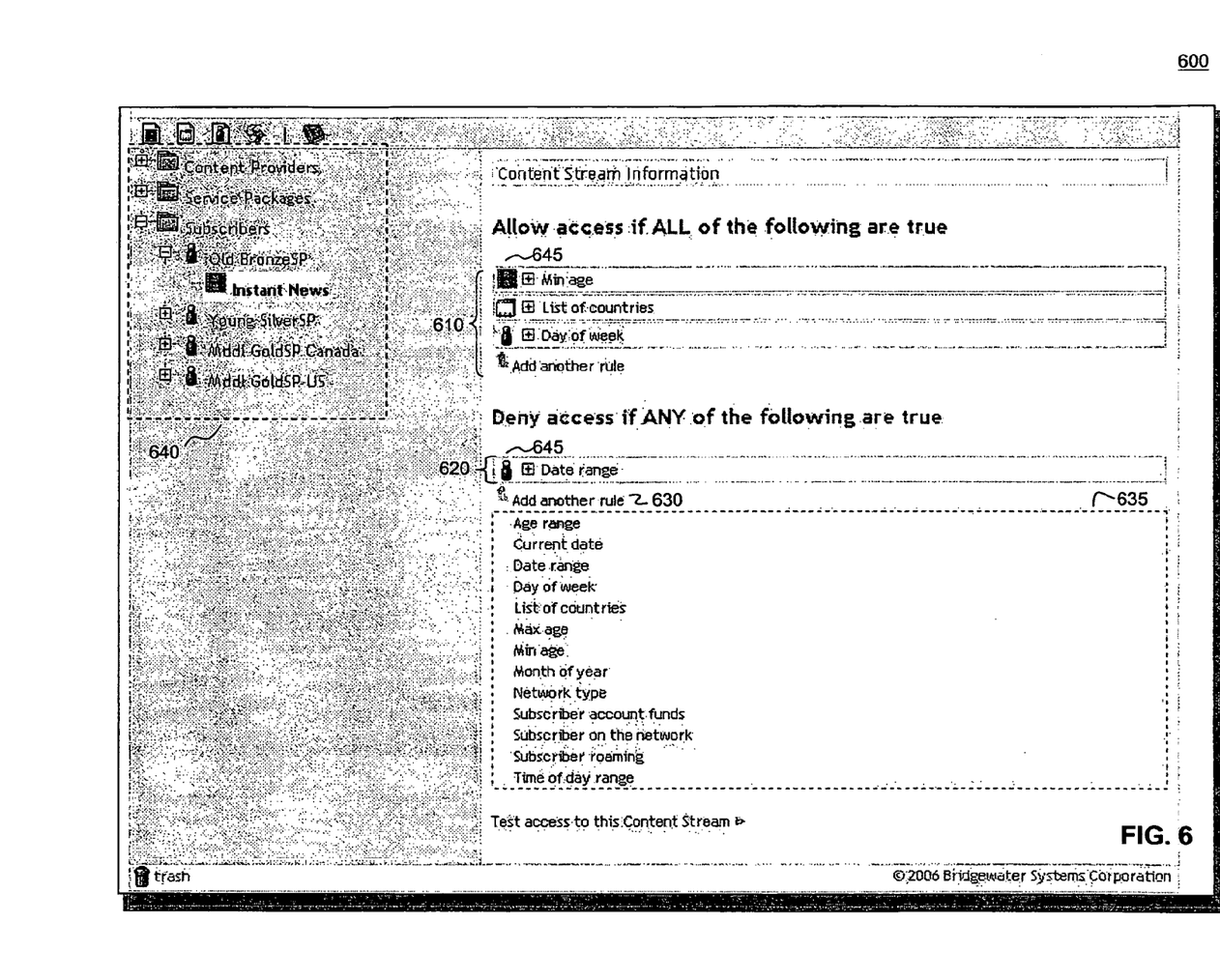
FIG. 6 depicts an exemplary screen shot showing a graphical user interface (GUI) for defining a policy instance according to the generic simple policy expression method.

FIG. 6 depicts an exemplary screen shot 600 showing a graphical user interface (GUI) 600 for defining a policy instance according to the generic simple policy expression method. GUI 600 includes a inclusion rule instance definition portion 610 and an exclusion rule instance definition portion 620. An additional rule instance can be added to either the set of rule inclusions or the set of rule exclusions by activating the "add another rule" link 630. Screen shot 600 also includes a context portion 640 defining three levels of context—content providers/streams (services a user can access), service packages, and subscribers. In addition, each rule includes a context identifier 645 which indicates the context level at which the rule instance was specified. Context levels are described in further detail in Section 3.

Figure 5B:
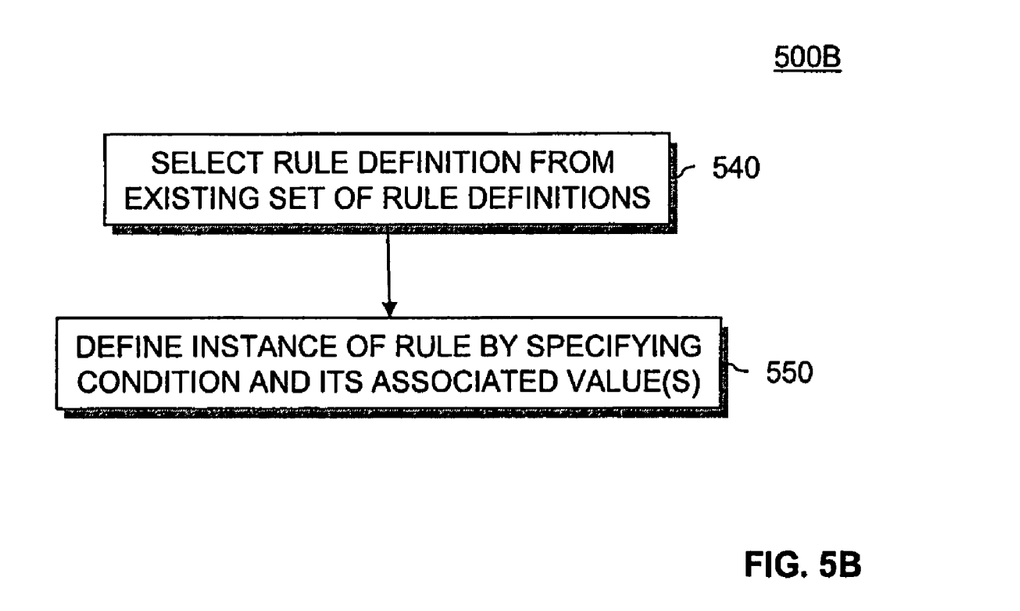
FIG. 5B is a flowchart of an exemplary method for defining rule instances using a generic simple policy expression method, according to embodiments of the present invention.

FIG. 5B is a flowchart 500B of an exemplary method for defining rule instances using a generic simple policy expression method, according to embodiments of the present invention.

In step 540, a rule definition is selected from an existing set of rule definitions. As illustrated in FIG. 6, when a user activates the "add another rule" link 630, a set of existing rule definitions is displayed. The user then selects a rule definition from the set.

Figure 7:
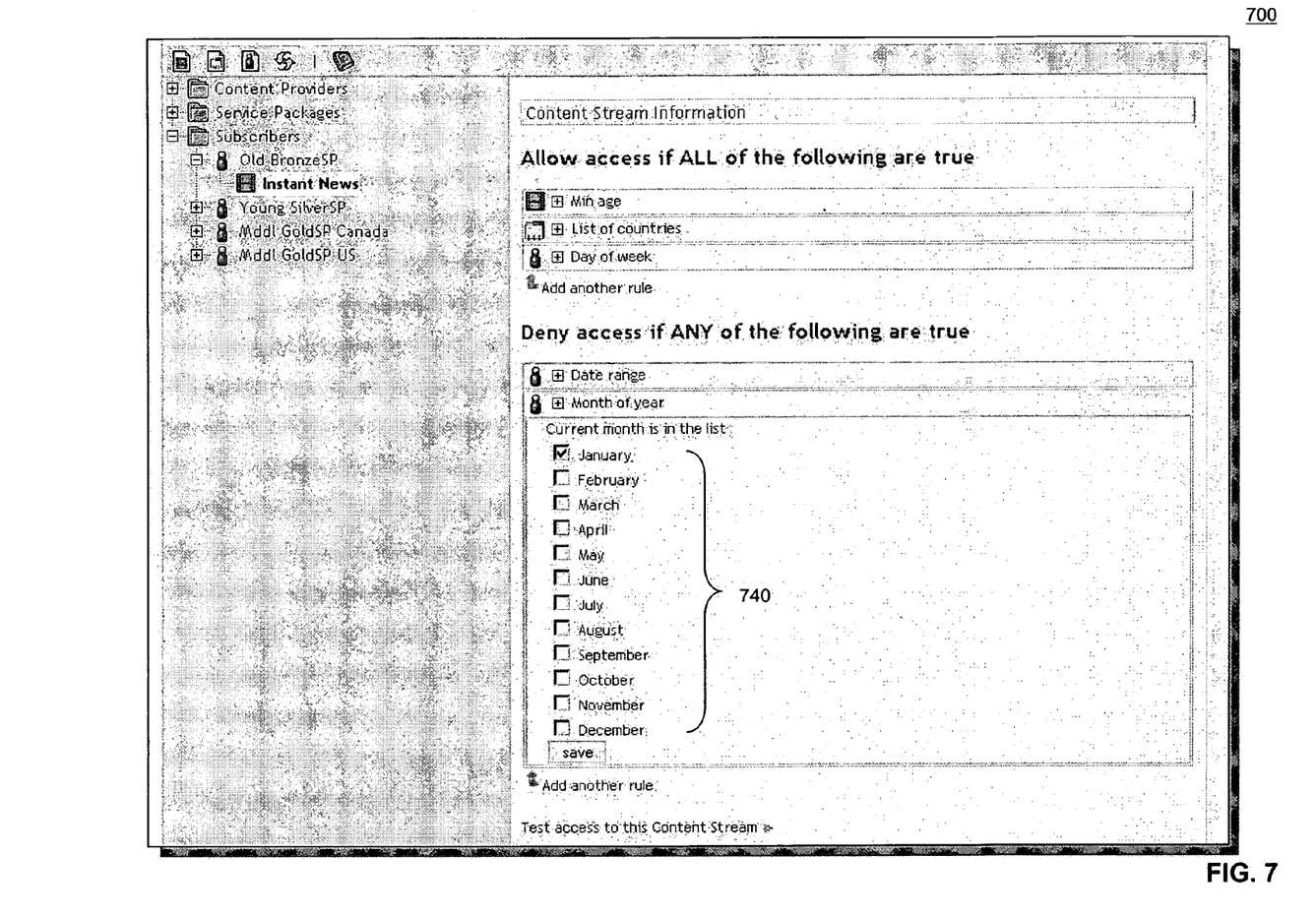
FIG. 7 depicts an exemplary screen shot including a section for defining the instance of the selected rule.

In step 550, the instance of the rule is defined by specifying a value or values for any variables included in the rule definition. For example, the value or values may be selected from a set of values for the variable. The set of values may be predefined by a user. FIG. 7 depicts an exemplary screen shot 700 including a section 740 for defining the instance of the selected rule. In this example, the user selected the rule definition "month of year" in step 540. The user can then specify the value or values for the rule variable "month."

3. Policy Interface Extensibility Methods

As described above, a policy instance is associated with a context. The policy management interface allows a provider of the resource or application to establish N hierarchical levels of context. In addition, each level may have multiple contexts associated with it. A provider may specify any number of contexts and any form of hierarchy for the contexts. The following is an example of a context level hierarchy for use in the policy management interface.

---

LEVEL 1 - Context A, Context B (e.g., content providers)
    LEVEL 2 - Context C (e.g., service packages)
        LEVEL 3 - Context D (e.g., subscribers)
.
.
.
LEVEL N - Context N

---

In addition, policy management interface subsystem 180 allows rule instance inheritance across contexts. For example, a context may inherit rule instances from a higher context level. In addition, or alternatively, policy management interface subsystem 180 may allow a user to link contexts for inheritance purposes.

In current rule-based service management systems, defined policies cannot be extended. Instead, new rule flows must be created for each instance. For example, assume two groups of subscribers need the same rule flow to achieve a specified goal except the first group needs its ages compared to 18 whereas the second group needs its age compared to 21. Despite the similarity of rule instances for each group, separate rule sets must defined in current rule-based systems. The following is an example of the two rule sets which must be defined:

---

GROUP 1
    IF subscriber age is greater than 18 THEN
        IF subscriber is located in Europe THEN
            IF day of week is NOT Saturday or Sunday THEN
                IF today is NOT a civic holiday THEN
                      Provide maximum network QOS, and
                      allow access to video application
GROUP 2
    IF subscriber age is greater than 21 THEN
        IF subscriber is located in Europe THEN
            IF day of week is NOT Saturday or Sunday THEN
                IF today is NOT a civic holiday THEN
                      Provide maximum network QOS, and
                      allow access to video application

---

As can be seen from the above example, the rules need to be redefined for both groups, requiring changes to be made directly via the rule definition interface.

Using policy interface extensibility, the set of rule instances can be defined for Group 1 at a high context and can then be further refined by adding a single rule instance at a lower context for users of Group 2. The simple policy expression for Group 2 is then:
PERFORM ACTIONS
    (1) allow video application access (inherited)
    (2) allow maximum network QOS (inherited)
IF ALL OF THE FOLLOWING APPLY:
subscriber age is greater than 21
subscriber age is greater than 18 (inherited)
subscriber package is gold package (inherited)
subscriber location is Europe (inherited)
UNLESS ANY OF THE FOLLOWING APPLY:
today is Saturday or Sunday (inherited)
today is a civic holiday [from list of holidays] (inherited)

In this example, the initial rule instances defined at the higher context need not be redefined for the Group 2 policy. Instead, all but one rule instance was inherited from a higher context level. The restriction, age is greater than 21, was added at the lower context. Re-entry of the other rules was not necessary for the Group 2 policy instance.

FIG. 6 depicts an exemplary screen shot 600 illustrating inheritance across contexts. Screen shot 600 includes a context portion 640 defining three levels of context—content providers/streams (services a user can access), service packages, and subscribers. In addition, each rule includes a context identifier 645 which indicates the context level at which the rule instance was specified. For example, the minimum age rule was specified at the content provider/stream level and inherited at the subscriber context level.

Via the use of policy extensibility, policies are faster to create and easier to maintain than with a rule engine alone. In addition, from a data storage perspective, far less data needs to be stored for policies. In a rule-engine, all policies would be stored as a list of all conditions and the values associated with the conditions. In contrast, the policy extensibility method allows for a single instance of a rule to exist with policies referring to the rules that are pertinent and with only the condition variables stored for each policy. The real-time substitution of these condition variables aids in achieving this extensibility.

4. Policy Interface Automatic Synchronization Method

Because rule definitions and data upon which the rules operate can be added or modified after deployment, techniques are needed to automatically synchronize this information into policy management interface 170. In conventional rule-based systems, this type of synchronization requires manual interface changes including code changes and application restarts.

Figure 8:
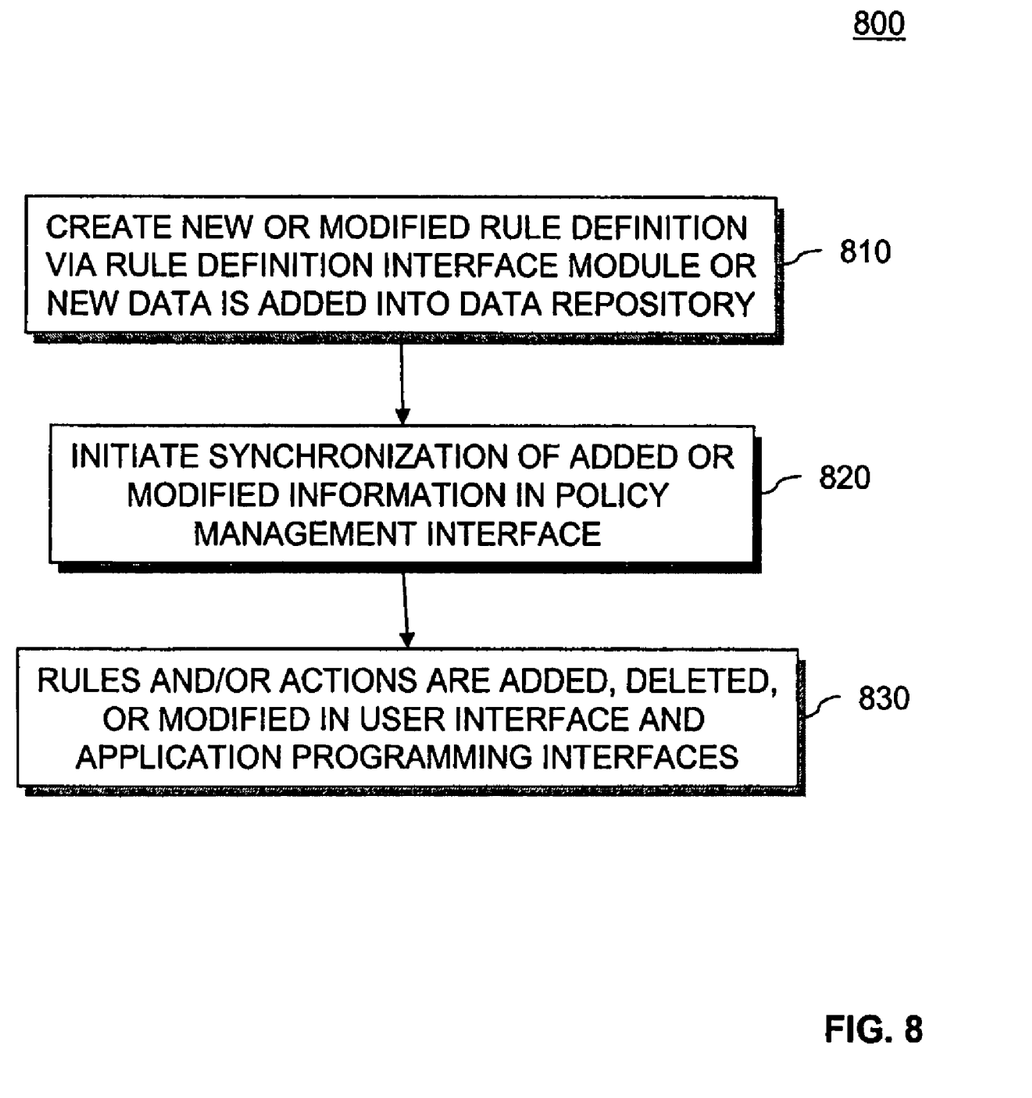
FIG. 8 depicts a flowchart of a method for automatic synchronization of the policy interface, according to embodiments of the present invention.

FIG. 8 depicts a flowchart 800 of a method for automatic synchronization of the policy management interface 170, according to embodiments of the present invention. The method of FIG. 8 allows policy management interface 170 to be updated without manual coordination between rule engine 162 and policy management interface 170. FIG. 8 is described with continued reference to the exemplary operation system of FIG. 1. However, FIG. 8 is not limited to that embodiment. Note that some of the steps of FIG. 8 do not necessarily have to occur in the order shown.

In step 810, a new or modified rule definition is created via rule definition interface module 142 or new data is added into data repository 172 upon which the rules operate. New data may include modification or additions to the values associated with a rule instance or modification or additions to the set of possible values that a variable in a rule condition may take.

In step 820, synchronization of the added or modified information with the user interface and/or application programming interfaces of policy management interface 170 is initiated. In an embodiment, the initiation is via database triggers in the rule repository 144 and data repository 172. In this embodiment, policy decision interface module 160 receives the triggers and initiates the necessary modifications in policy management interface 170. In alternative embodiments, synchronization may be achieved through a combination of application program interface communication, remote method invocation, as well as through the user of messaging frameworks such as Java Message Service (JMS) messaging.

In step 830, the rules and/or actions are added, deleted, or modified in the user interface and application programming interfaces of the policy management interface module 170.

The automatic synchronization described above allows for seamless changes to be made between the rule definition interface 142 and policy management interface 170. Because neither interface needs to be halted for the purpose of synchronizing its rule configuration, services do not be paused or stopped. In addition, because no manual synchronization steps are necessary, the efficiency of personnel required to create or alter rule sets and policies is increased.

5. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for policy-based service management, comprising:
    a hardware device including a rules definition interface module configured to receive a plurality of rule definitions stored in a data storage, wherein a rule definition includes a condition containing a rule definition variable;
    a policy management interface module configured to allow a user to define a rule instance from a rule definition and to define a policy instance based on one or more defined rule instances, wherein the user defines the rule instance by associating the condition in the rule definition containing the rule definition variable with one or more values in a user-defined value set; and
    a policy decision interface module configured to evaluate the policy instance upon request, for access to a network or a network resource by a subscriber device, wherein the policy decision interface is configured to retrieve one or more rule instances associated with the policy instance and to substitute one or more values in the user-defined value set associated with each variable in the rule instance in real-time when the rule instance is being evaluated by the policy decision interface module.

2. The system of claim 1, further comprising: a rule repository configured to store the plurality of rule definitions.

3. The system of claim 2, wherein the rule repository further includes a trigger to identify the addition of the rule definition into the rule repository.

4. The system of claim 3, wherein the policy decision interface module is further configured to initiate synchronization of the added rule definition with the policy management interface module when a rule repository trigger event is received.

5. The system of claim 1, wherein the policy decision interface module is further configured to access an external database for information when a request is received.

6. The system of claim 1, wherein the policy decision interface module is further configured to access an application programming interface for information when a request is received.

7. The system of claim 1, wherein the policy management interface module is configured to allow a user to associate the policy instance with a context.

8. The system of claim 7, wherein the context is associated with a level in a context hierarchy having N-levels.

9. The system of claim 8, wherein the policy management interface is further configured to associate one or more rule instances defined for contexts at higher levels in the context hierarchy with the policy instance.

10. The system of claim 1, wherein the policy management interface comprises:
a graphical user interface including an inclusion rule definition portion and an exclusion rule definition portion.

11. The system of claim 1, wherein the policy management interface comprises: an application programming interface.

12. The system of claim 10, wherein the policy management interface further comprises an action definition portion, wherein the action definition portion presents a set of possible actions which can be associated with the policy instance.

13. The system of claim 10, wherein the inclusion rule definition portion presents the plurality of rule definitions, wherein a rule definition from the plurality of rule definitions is selected for association with a set of inclusion rules.

14. The system of claim 10, wherein the exclusion rule definition portion presents the plurality of rule definitions, wherein a rule definition from the plurality of rule definitions is selected for association with a set of exclusion rules.

15. A method for generating a policy instance in a hardware-based policy management interface subsystem, comprising:
receiving, using a processor, a request to define a policy instance in the policy management interface subsystem;
providing, using a processor, a plurality of existing rule definitions, each rule definition including one or more conditions, wherein at least one condition includes a rule definition variable;
selecting, a rule definition from the plurality of rule definitions for inclusion in the policy instance;
associating, one or more values with each rule definition variable in the selected rule definition wherein each value is a member of a user-defined value set; and
receiving, using a processor, a rule instance of the selected rule definition for the policy instance, wherein one or more values in the user-defined value set associated with each variable are substituted into the rule instance in real-time when the rule instance is being evaluated in response to a request for access to a network or a network resource by a subscriber device, and
wherein the plurality of existing rule definitions is defined via a rule definition interface separate from the policy management interface subsystem.

16. The method of claim 15, further comprising:
storing the defined policy instance in a data repository, wherein the policy instance is accessed when a request for a service management decision is received by a provider.

17. The method of claim 15, wherein the rule instance is associated with a set of inclusion rules for the policy instance.

18. The method of claim 15, wherein the rule instance is associated with a set of exclusion rules for the policy instance.

19. The method of claim 15, further comprising: providing a set of possible actions for the policy instance; and receiving an action to be associated with the policy instance, wherein the action was selected from the set of possible actions for the policy instance.

20. The method of claim 15, further comprising:
receiving a request to associate the policy instance with a context.

21. The method of claim 19, wherein the context is associated with a level in a context hierarchy having N-levels.

22. The method of claim 21, further comprising:
associating one or more rule instances defined for contexts at higher levels in the context hierarchy with the policy instance.

23. A method for evaluating a request for a policy-based service management decision by a hardware-based policy management interface subsystem, comprising:
receiving, using a processor, a request from a policy enforcement element for a service management decision associated with an access attempt to a network or a network resource by a subscriber device;
retrieving, using a processor, one or more policy instances comprising of one or more rule definitions necessary to process the service management decision request, wherein the policy instance determines a set of actions, and wherein one or more rule definitions contain one or more rule definition variables wherein the rule definition variable is associated with a value selected from a user-defined value set;
retrieving, using a processor, the user-defined value set for each variable defined in one or more retrieved rule definitions;
substituting, using a processor, one or more values in the user-defined value set corresponding to each rule definition variable into the rule definitions in real-time as the rule is being evaluated;
evaluating, using a processor, each of the retrieved policy instances to determine if the set of actions defined in the policy is to be performed by the policy enforcement element; and
communicating a result of the evaluation to the policy enforcement element.

24. The method of claim 23, wherein the request includes information about the subscriber.

25. The method of claim 23, wherein the one or more rule definitions are retrieved prior to the receipt of the request and stored locally.

26. The method of claim 23, wherein the one or more rule definitions are retrieved from a rule repository when the request is received.

27. The method of claim 23, wherein a first set of rule definitions is retrieved prior to receipt of the request and a second set of rule definitions is retrieved from a rule repository when the request is received.

28. The method of claim 23, further comprising:
retrieving information from an external database prior to evaluating the retrieved policies.

29. The method of claim 23, further comprising:
retrieving information from an application programming interface prior to evaluating the retrieved policies.

30. The method of claim 23, further comprising:
prior to retrieving the set of values, identifying a source of the values for each variable.

* * * * *